US008479853B2

(12) United States Patent
Verbrugge

(10) Patent No.: US 8,479,853 B2
(45) Date of Patent: Jul. 9, 2013

(54) CONTROL OF AN AIRSTREAM FLOW RATE THROUGH A COVERED COMPARTMENT BY AN ADJUSTABLE SHUTTER

(75) Inventor: David J. Verbrugge, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 167 days.

(21) Appl. No.: 13/109,046

(22) Filed: May 17, 2011

(65) Prior Publication Data

US 2012/0292122 A1 Nov. 22, 2012

(51) Int. Cl.
*B60K 11/06* (2006.01)

(52) U.S. Cl.
USPC ........................................ 180/68.2; 180/68.4

(58) Field of Classification Search
USPC ...................................... 180/68.1–68.2, 68.4
See application file for complete search history.

(56) References Cited

U.S. PATENT DOCUMENTS 2,913,065 A * 11/1959 Lyon, Jr. ...................... 180/68.1
4,658,925 A * 4/1987 Hirosawa et al. ............ 180/68.1
5,275,249 A * 1/1994 Nelson ........................ 180/69.2

* cited by examiner

*Primary Examiner* — Jeffrey J Restifo
*Assistant Examiner* — Erez Gurari
(74) *Attorney, Agent, or Firm* — Quinn Law Group, PLLC

(57) ABSTRACT

A system for controlling a flow rate of an airstream through a compartment includes a panel configured to cover the compartment. The system also includes a first opening defined by the compartment and configured to permit the airstream to enter the covered compartment from the ambient when the compartment is covered by the panel. The system also includes a second opening defined by the panel and configured to permit at least a portion of the airstream to exit the covered compartment to the ambient. The system additionally includes a selectable position shutter assembly configured to control the size of the second opening and adjust a flow rate of the airstream through the covered compartment. A vehicle employing the shutter assembly to vary a flow rate of at least a portion of an airstream through the vehicle's under-hood area is also disclosed.

14 Claims, 3 Drawing Sheets

10
12
18
20
24
26
28
30
31
32
34
36
38
40
41
42
44
45
46
48
50
52
54
56
58
60
62
64

10
12
18
20
24
26
28
30
31
32
34
36
38
40
41
42
44
45
46
48
50
52
54
56
58
60
62
64

CONTROL OF AN AIRSTREAM FLOW RATE THROUGH A COVERED COMPARTMENT BY AN ADJUSTABLE SHUTTER

TECHNICAL FIELD

The invention relates to control of an airstream flow rate through a covered compartment by an adjustable shutter.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other.

Shutters may be employed in motor vehicles to control and direct an airstream to various vehicle compartments and/or subsystems. Therefore, a shutter may be employed to enhance operation of a range of vehicle systems, as well as comfort of vehicle passengers.

SUMMARY

A system for controlling a flow rate of an airstream through a compartment includes a panel configured to cover the compartment. The system also includes a first opening defined by the compartment and configured to permit the airstream to enter the covered compartment from the ambient when the compartment is covered by the panel. The system also includes a second opening defined by the panel and configured to permit at least a portion of the airstream to exit the covered compartment to the ambient. The system additionally includes a selectable position shutter assembly configured to control the size of the second opening and adjust a flow rate of the airstream through the covered compartment.

The enclosed compartment may be a portion of a front end of a vehicle body and the panel may be a hood configured to cover the portion of the front end to thereby define the covered compartment as an under-hood area. Additionally, the first opening may be a grille opening disposed at the front end of the vehicle body and the second opening may be a vent opening defined by the hood.

Additionally, the under-hood area may house an internal combustion engine and a heat exchanger. In such a case, the engine may be cooled by a fluid circulating through the heat exchanger and the airstream may be passed through the heat exchanger to cool the fluid after the fluid is passed through the engine. Furthermore, in such a case, the selection of the position for the shutter assembly may vary the flow rate of the airstream passed through the heat exchanger.

The shutter assembly may include a mechanism configured to select a position of the shutter assembly between and inclusive of the fully opened and fully closed. Additionally, the shutter assembly may include at least one louver and the mechanism is configured to rotate the at least one louver to selectively cover and uncover the vent opening.

After the airstream enters the under-hood area through the grille opening, the airstream may be split into a first portion and a second portion by a divider. Furthermore, each of the first and second portions may be passed through the heat exchanger, and the second portion of the airstream may be directed to the vent opening after being passed through the heat exchanger.

The system may also include a controller configured to regulate the mechanism. In such a case, the controller may be configured to regulate the mechanism according to a load on the engine.

The engine may be cooled by a fluid circulated through a heat exchanger. Additionally, the engine may include a sensor to sense a temperature of the fluid that is configured to communicate the temperature to the controller. Furthermore, the controller may be configured to regulate the mechanism to cool the fluid circulated through the heat exchanger according to the sensed temperature of the fluid.

The above features and advantages and other features and advantages of the present invention are readily apparent from the following detailed description of the best modes for carrying out the invention when taken in connection with the accompanying drawings.

DETAILED DESCRIPTION

Figure 1:
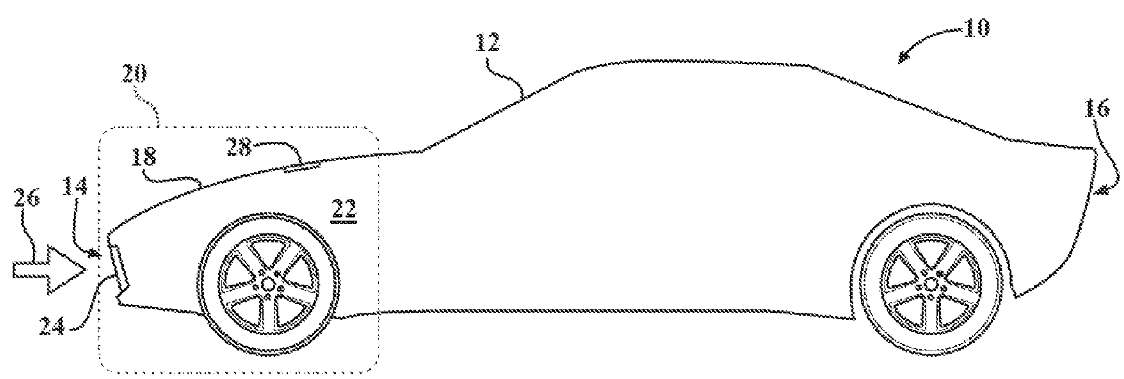
FIG. 1 is a schematic side view of a vehicle having a shutter assembly configured to control a flow of an airstream through the under-hood area.

Referring to the drawings, wherein like reference numbers refer to like components, FIG. 1 shows a vehicle 10. The vehicle 10 includes a vehicle body 12 which is characterized by a first end 14 and a second end 16. The vehicle 10 also includes a hood 18 configured to cover a portion 20 of the first end 14 to thereby define a covered compartment which is an under-hood area 22. A first or grille opening 24 is disposed at the first end 14 of the vehicle body 12. The grille opening 24 is configured to permit an airstream 26 to enter the under-hood area 22 from the ambient. A second or vent opening 28 is defined by the hood 18 and is configured to permit the airstream 26 to exit the under-hood area 22 and return to the ambient, thus generating an airstream flow-out hood. Generally, the openings, particularly those located at the front of a vehicle, as well as various protruding features on the surface of the vehicle body, tend to impact the vehicle's aerodynamic signature.

Figure 2:
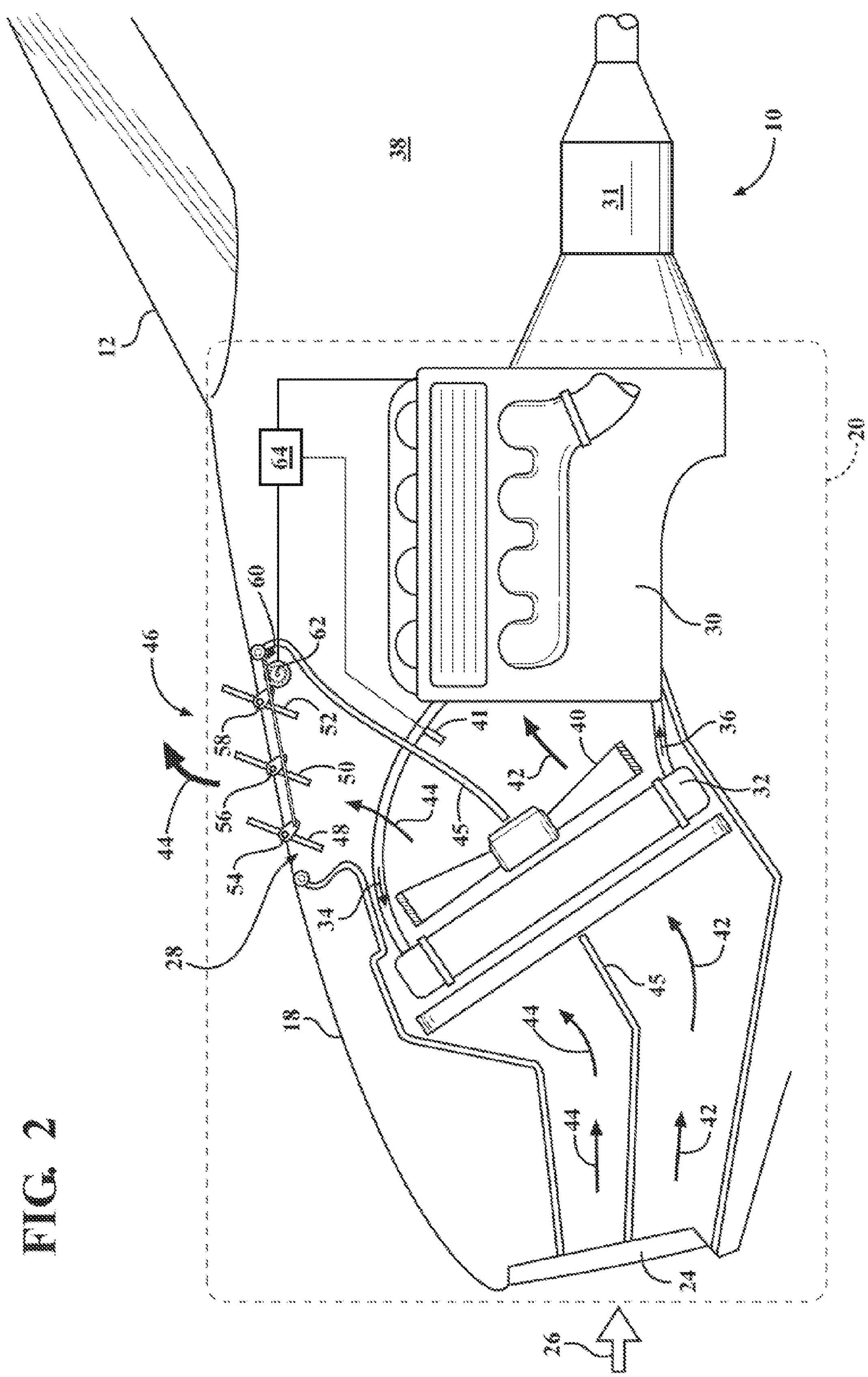
FIG. 2 is a cross-sectional partial side view of the vehicle having the shutter assembly shown in FIG. 1, the shutter assembly depicted in a fully opened state.
Figure 3:
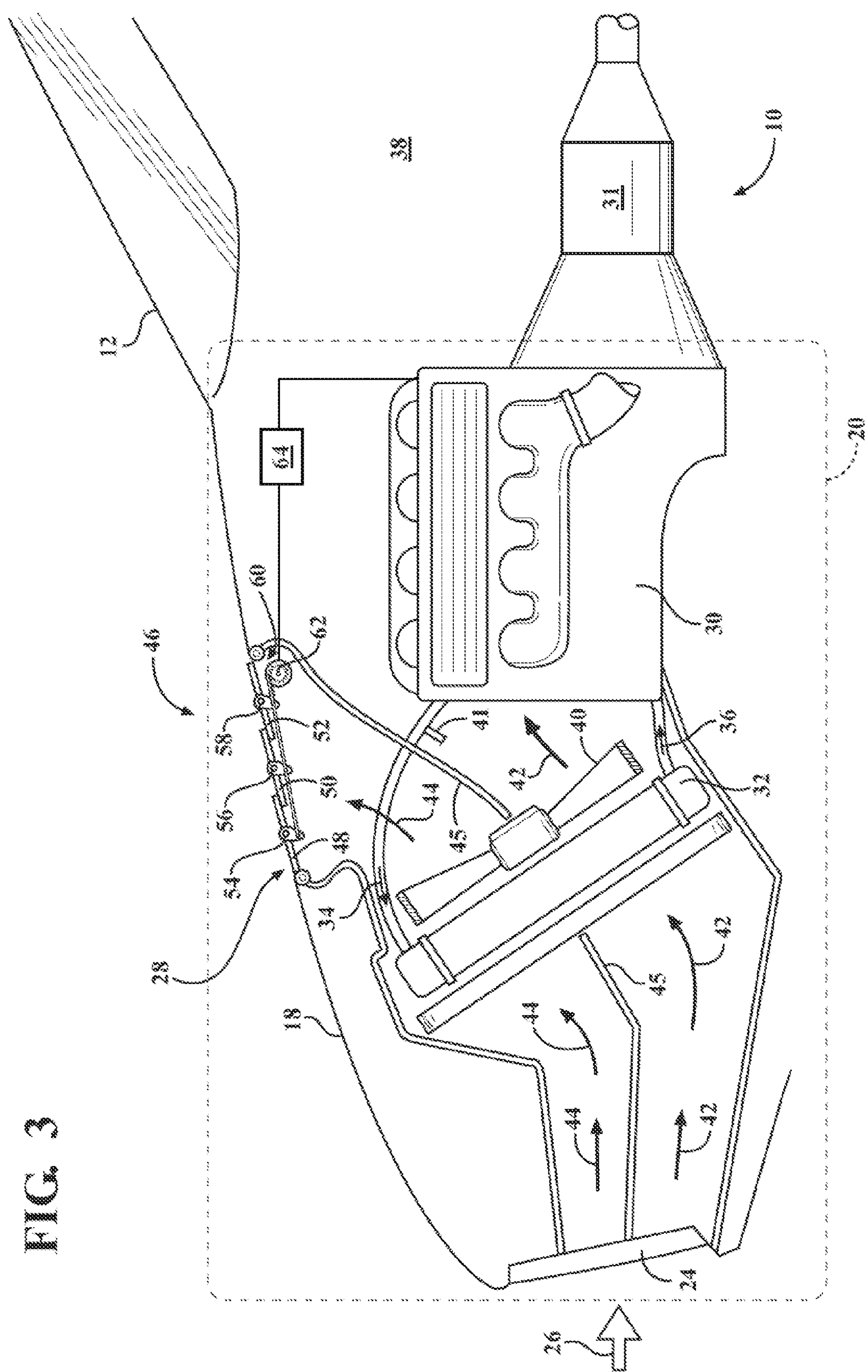
FIG. 3 is a cross-sectional partial side view of the vehicle having the shutter assembly shown in FIG. 1, the shutter assembly depicted in a fully closed state.

As shown in FIGS. 2-3, the vehicle 10 also includes an internal combustion engine 30 configured to propel the vehicle and an air-to-fluid heat exchanger 32, i.e., a radiator, for cooling the engine 30. The engine 30 is typically part of a vehicle powertrain that also includes a transmission 31, as shown. Both the engine 30 and heat exchanger 32 are mounted in the under-hood area 22 where they can be accessed by the airstream 26. After being admitted through the grille opening 24, the airstream 26 is passed through the heat exchanger 32. By passing through the heat exchanger 32, the airstream 26 facilitates cooling of a circulating fluid, such as water or a specially formulated coolant, shown by arrows 34 and 36, that is used to carry heat away from the engine 30 to the heat exchanger. Typically, the coolant is continuously circulated by a fluid pump (not shown) between the engine 30 and the heat exchanger 32. Accordingly, the arrow 34 represents the high-temperature coolant exiting the engine and the arrow 36 represents the reduced-temperature coolant exiting the heat exchanger. The transmission 31 is typically lubricated by oil that, in certain highly stressed vehicle applications, may require auxiliary cooling. In such applications, the transmission oil may also be passed through the heat exchanger 32 to achieve the desired cooling.

As shown in FIGS. 2-3, the heat exchanger 32 is positioned behind the grille opening 24 that is covered by a mesh (not shown) for protection of the heat exchanger from various road- and air-borne debris. Although the heat exchanger 32 is shown as being positioned at the front of the vehicle, the heat exchanger may also be positioned in a different location, such as behind a passenger compartment 38, if, for example, the vehicle has a rear or a mid-engine configuration. A fan 40 may be positioned behind the heat exchanger 32 for drawing the airstream 26 through the heat exchanger 32. The fan 40 may be driven either electrically by an electric motor (not shown), or mechanically by the engine 30. Accordingly, although the fan 40 may be capable of being selectively turned on and off based on the cooling needs of the engine 30, the fan's operation typically consumes power that tends to reduce operating efficiency of the vehicle 10.

Depending on the road speed of the vehicle 10, the fan 40 is adapted to either generate or enhance a flow of airstream 26 from the ambient through the grille opening 24 and on through the heat exchanger 32. Thus generated or enhanced through the action of the fan 40, the airstream 26 is passed through the heat exchanger 32 to remove heat from the high-temperature coolant 34 before the reduced-temperature coolant 36 is returned to the engine 30. The vehicle 10 additionally includes a coolant sensor 41 configured to sense a temperature of the high-temperature coolant 34 as the coolant exits the engine 30. After the airstream 26 enters the under-hood area 22 through the grille opening 24, the airstream is split into a first portion 42 and a second portion 44 via a divider 45. Each of the first and second portions 42, 44 is passed through the heat exchanger 32. Following the first and second portions 42, 44 being passed through the heat exchanger 32, the second portion 44 is directed to the vent opening 28. The vent opening 28 is accordingly positioned and sized to permit the second portion 44 to exit the under-hood area 22 and return to the ambient.

FIGS. 2-3 also depict a rotatable or selectable position shutter assembly 46. The shutter assembly 46 is disposed on the hood 18 at the vent opening 28 and is adapted to regulate an amount of the second portion 44 of the airstream 26 exiting the under-hood area 22 to the ambient through the vent opening. As shown, the shutter assembly 46 includes a plurality of louvers, herein shown as having three individual louver elements 48, 50, and 52, but the number of louvers may be either fewer or greater. The shutter assembly 46 is configured to control the size of the vent opening 28 such that a flow rate of the second portion 44 of the airstream 26 through the under-hood area 22 is adjusted or varied. The shutter assembly 46 controls the size of the vent opening 28 by selectively uncovering the vent opening to thereby permit the second portion 44 of the airstream 26 to exit the under-hood area 22 to the ambient, and to substantially cover the vent opening.

Each louver 48, 50, and 52 is configured to rotate about a respective pivot axis 54, 56, and 58 during operation of the shutter assembly 46. Such rotation of the louvers 48, 50, and 52 effectively controls the size of the vent opening 28 and the amount of the second portion 44 of the airstream 26 exiting the under-hood area 22. The shutter assembly 46 is adapted to operate between and inclusive of a fully closed position or state, through an intermediate or partially-closed position, and to a fully opened position. Accordingly, when the louver elements 48, 50, and 52 are in the fully opened position (as shown in FIG. 2), the second portion 44 of the airstream 26 is unrestricted to exit the under-hood area 22. Additionally, when the louver elements 48, 50, and 52 are in the partially opened position, which is not shown but would be appreciated by those skilled in the art, the second portion 44 may exit the under-hood area 22, but its passage through the vent opening 28 is restricted. Furthermore, when the louver elements 48, 50, and 52 are in the fully closed position (as shown in FIG. 3), the second portion 44 is substantially blocked from exiting the under-hood area 22.

The shutter assembly 46 also includes a mechanism 60 configured to adjust the louver elements 48, 50, and 52, and thereby select and lock a desired position of the shutter assembly between and inclusive of fully opened and fully closed. The mechanism 60 is configured to cause the louvers 48-52 to rotate in tandem, i.e., substantially in unison, and permitting the shutter assembly 46 to adopt any of the available positions. The mechanism 60 may be adapted to select discrete intermediate position(s) of the louvers 48-52, or to infinitely vary the position of the louvers between and inclusive of the fully opened and fully closed. The mechanism 60 acts to select the desired position for the shutter assembly 46 when the mechanism is activated by any external means, such as the electric motor 62 shown in FIGS. 2 and 3.

As shown in FIGS. 2-3, the vehicle 10 also includes a controller 64, which may be an engine controller or a separate control unit, configured to operate the mechanism 60 for selecting the desired position of the shutter assembly 46. The controller 64 may also be configured to operate the fan 40, if the fan is electrically driven, and a thermostat (not shown) that is configured to regulate the circulation of coolant, as understood by those skilled in the art. The controller 64 is programmed to operate the mechanism 60 in response to the load on the engine 30 and according to the temperature of the coolant sensed by the sensor 41. The temperature of the high-temperature coolant 34 is increased due to the heat produced by the engine 30 under load. As known by those skilled in the art, having the engine 30 propel the vehicle 10 up a hill and/or pull a trailer are the types of operating conditions that drive up the internal temperature of the engine. In turn, an increase in the engine's internal temperature necessitates more rapid engine cooling for desired performance and reliability.

When the fully closed position for the shutter assembly 46 is selected by the controller 64, the flow rate of the second portion 44 of the airstream 26 through the under-hood area 22 is retained at a predetermined base level of flow. Accordingly, the fully closed position for the shutter assembly 46 achieves a base level of cooling for the high-temperature coolant 34 inside the heat exchanger 32. When the fully opened position for the shutter assembly 46 is selected by the controller 64, the flow rate of the second portion 44 of the airstream 26 through the under-hood area 22 is increased from the base level of flow to a maximum flow permitted by the under-hood area and the size and power of the fan 40. Accordingly, the fully opened position for the shutter assembly 46 achieves an increased level of cooling for the high-temperature coolant 34 inside the heat exchanger 32, as may be required by the cooling needs of the engine 30. An intermediate, partially opened position for the shutter assembly 46 may also be selected by the controller 64 in response to a particular cooling need of the engine 30. Such a partially opened position for the shutter assembly 46 may generate a commensurate intermediate flow rate of the second portion 44 of the airstream 26 through the under-hood area 22.

Overall, the shutter assembly 46 provides an adjustable size exit for under-hood airflow in the vehicle 10. The shutter assembly 46 is characterized by the ability to control and enhance the flow rate of the second portion 44 of the airstream 26 through the heat exchanger 32 without increasing either the size of the grille opening 24 or the size and power of the fan 40. Additionally, the ability to either open or close the shutter assembly 46 on demand allows the aerodynamic signature of the vehicle 10 to be modified in line with the cooling requirements of the vehicle's powertrain. Consequently, the use of the selectable position shutter assembly 46 at the vent opening 28 permits improved aerodynamics and increased fuel efficiency of the vehicle 10.

While the best modes for carrying out the invention have been described in detail, those familiar with the art to which this invention relates will recognize various alternative designs and embodiments for practicing the invention within the scope of the appended claims.

The invention claimed is:

1. A system for controlling a flow rate of an airstream through a portion of a front end of a vehicle body, the system comprising:

a hood configured to cover the portion of the front end to thereby define an under-hood area;

a grille opening disposed at the front end of the vehicle body and configured to permit the airstream to enter the under-hood area from the ambient;

a vent opening defined by the hood, wherein the hood is configured to permit at least a portion of the airstream to exit the under-hood area to the ambient;

a selectable position shutter assembly configured to control the size of the vent opening and adjust a flow rate of the airstream through the under-hood area; and a divider arranged in the under-hood area and configured to split the airstream into a first portion and a second portion;

wherein:

the under-hood area houses an internal combustion engine and a heat exchanger, wherein the engine is cooled by a fluid circulating through the heat exchanger and the airstream is passed through the heat exchanger to cool the fluid after the fluid is passed through the engine, and wherein selection of the position for the shutter assembly varies the flow rate of the airstream passed through the heat exchanger; and after the airstream enters the under-hood area through the grille opening and is split by the divider, each of the first and second portions of the airstream is passed through the heat exchanger, and wherein the second portion is directed to the vent opening after the second portion of the airstream is passed through the heat exchanger.

2. The system of claim 1 , wherein the shutter assembly includes a mechanism configured to select the position of the shutter assembly between and inclusive of fully opened and fully closed.

3. The system of claim 2, wherein the shutter assembly includes at least one louver and the mechanism is configured to rotate the at least one louver to selectively cover and uncover the vent opening.

4. The system of claim 2, further comprising a controller configured to regulate the mechanism.

5. The system of claim 4, wherein the controller is configured to regulate the mechanism according to a load on the engine.

6. The system of claim 4, wherein the engine is cooled by a fluid circulated through a heat exchanger, and wherein the engine includes a sensor to sense a temperature of the fluid and configured to communicate the temperature to the controller.

7. The system of claim 6, wherein the controller is configured to regulate the mechanism to cool the fluid circulated through the heat exchanger according to the sensed temperature of the fluid.

8. A vehicle comprising:

a vehicle body having a first end and a second end;

a grille disposed at the first end of the vehicle body;

a hood configured to cover a portion of the first end of the body to thereby define an under-hood area;

a grille opening defined by the grille, wherein the grille opening is configured to permit an airstream to enter the under-hood area from the ambient;

a vent opening defined by the hood, wherein the vent opening is configured to permit at least a portion of the airstream to exit the under-hood area to the ambient;

a selectable position shutter assembly disposed on the hood and configured to control the size of the vent opening:

an internal combustion engine and a heat exchanger, each mounted in the under-hood area, wherein the engine is cooled by a fluid circulating through the heat exchanger and the airstream is passed through the heat exchanger to cool the fluid after the fluid is passed through the engine, and wherein selection of the position for the shutter assembly varies the flow rate of the airstream passed through the heat exchanger; and a divider configured to split the airstream into a first portion and a second portion after the airstream enters the under-hood area through the grille opening, pass each of the first and second portions through the heat exchanger, and direct the second portion to the vent opening after the second portion of the airstream is passed through the heat exchanger.

9. The vehicle of claim 8, wherein the shutter assembly includes a mechanism configured to select the position for the shutter assembly between and inclusive of fully opened and filly closed.

10. The vehicle of claim 9, wherein the shutter assembly includes at least one louver and the mechanism is configured to rotate the at least one louver to selectively cover and uncover the vent opening.

11. The vehicle of claim 9, further comprising a controller configured to regulate the mechanism.

12. The vehicle of claim 11, wherein the controller is configured to regulate the mechanism according to a load on the engine.

13. The vehicle of claim 11, wherein the engine is cooled by a fluid circulated through a heat exchanger, and wherein the engine includes a sensor to sense a temperature of the fluid and configured to communicate the temperature to the controller.

14. The vehicle of claim 13, wherein the controller is configured to regulate the mechanism to cool the fluid circulated through the heat exchanger according to the sensed temperature of the fluid.

* * * * *